US008013817B2

(12) United States Patent
Miller et al.

(10) Patent No.: US 8,013,817 B2

(45) Date of Patent: Sep. 6, 2011

(54) ELECTRONIC DISPLAY HAVING IMPROVED UNIFORMITY

(75) Inventors: Michael E. Miller, Honeoye Falls, NY (US); Paul J. Kane, Rochester, NY (US); Michael J. Murdoch, Rochester, NY (US)

(73) Assignee: Global OLED Technology LLC, Herndon, VA (US)

( * ) Notice: Subject to any disclaimer, the term of this patent is extended or adjusted under 35 U.S.C. 154(b) by 641 days.

(21) Appl. No.: 11/616,330

(22) Filed: Dec. 27, 2006

(65) Prior Publication Data

US 2008/0158107 A1 Jul. 3, 2008

(51) Int. Cl.

*G09G 3/32* (2006.01)
*G09G 5/02* (2006.01)
*G09G 3/30* (2006.01)
*G06F 3/038* (2006.01)

(52) U.S. Cl. ............. 345/83; 345/694; 345/76; 345/204

(58) Field of Classification Search .................... 345/88, 345/204, 690, 694, 76–83; 349/56, 84, 104–108
See application file for complete search history.

(56) References Cited

U.S. PATENT DOCUMENTS

| | | | | |
|---|---|---|---|---|
| 4,969,718 | A | 11/1990 | Noguchi et al. | |
| 5,113,274 | A | 5/1992 | Takahashi et al. | |
| 2002/0015110 | A1 | 2/2002 | Brown | |
| 2003/0128179 | A1 * | 7/2003 | Credelle | 345/88 |
| 2004/0113875 | A1 | 6/2004 | Miller et al. | |
| 2005/0083277 | A1 | 4/2005 | Credelle | |
| 2005/0168423 | A1 * | 8/2005 | Hirata et al. | 345/88 |
| 2005/0225574 | A1 | 10/2005 | Brown et al. | |
| 2005/0225575 | A1 | 10/2005 | Brown et al. | |
| 2005/0270444 | A1 | 12/2005 | Miller et al. | |
| 2006/0262147 | A1 * | 11/2006 | Kimpe et al. | 345/690 |
| 2007/0064020 | A1 * | 3/2007 | Credelle et al. | 345/694 |

FOREIGN PATENT DOCUMENTS

| | | |
|---|---|---|
| WO | 03/052725 | 6/2003 |
| WO | 2004/027503 | 4/2004 |
| WO | 2005/001805 | 1/2005 |
| WO | 2005/059875 | 6/2005 |

* cited by examiner

*Primary Examiner* — Lun-Yi Lao
*Assistant Examiner* — Jarurat Suteerawongsa
(74) *Attorney, Agent, or Firm* — Morgan, Lewis & Bockius LLP

(57) ABSTRACT

A display with improved visual uniformity, comprised of an array of independently-addressable light-emitting elements, including at least a first independently-addressable light-emitting element for producing a first color of light and a second independently-addressable light-emitting element for producing a second color of light; wherein at least the first independently-addressable light-emitting element is subdivided into at least two spatially separated commonly-addressed light-emitting areas and wherein at least a portion of the second independently-addressable light-emitting element is positioned between the spatially separated commonly-addressed light-emitting areas of the first independently-addressable light-emitting element.

9 Claims, 8 Drawing Sheets

ELECTRONIC DISPLAY HAVING IMPROVED UNIFORMITY

FIELD OF THE INVENTION

The present invention relates to flat panel displays, specifically flat panel displays having segmented light-emitting elements to provide improved spatial uniformity.

BACKGROUND OF THE INVENTION

Flat panel, color displays for displaying information, including images, text, and graphics are widely used. These displays may employ any number of known technologies, including liquid crystal light modulators, plasma emission, electro-luminescence (including organic light-emitting diodes), and field emission. Such displays include entertainment devices such as televisions, monitors for interacting with computers, and displays employed in hand-held electronic devices such as cell phones, game consoles, and personal digital assistants. In these displays, the resolution of the display is always a critical element in the performance and usefulness of the display. The resolution of the display specifies the quantity of information that can be usefully shown on the display and the quantity of information directly impacts the usefulness of the electronic devices that employ the display.

However, the term "resolution" is often used or misused to represent any number of quantities. Common misuses of the term include referring to the number of light-emitting elements or to the number of full-color groupings of light-emitting elements (typically referred to as pixels) as the "resolution" of the display. This number of light-emitting elements is more appropriately referred to as the addressability of the display. Within this document, we will use the term "addressability" to refer to the number of independently-addressable light-emitting elements per unit area of the display device. A more appropriate definition of resolution is to define the size of the smallest element that can be displayed with fidelity on the display. One method of measuring this quantity is to display the narrowest possible, neutral (e.g., white) horizontal or vertical line on a display and to measure the width of this line or to display an alternating array of neutral and black lines on a display and to measure the period of this alternating pattern. Note that using these definitions, as the number of light-emitting elements increases within a given display area, the addressability of the display will increase while the resolution, using this definition, generally decreases. Therefore, counter to the common use of the term "resolution", the quality of the display is generally improved as the resolution becomes finer in pitch or smaller.

Addressability in most flat-panel displays, especially active-matrix displays, is limited by the need to provide signal busses and electronic control elements in the display. Further in many flat panel displays, including Liquid Crystal Displays (LCDs) and bottom-emitting Electro-Luminescent (EL) displays, the electronic control elements are required to share the area that is required for light emission or transmission. In these technologies, the more such busses and control elements that are needed, the less area in the display is available for light emission. Depending upon the technology, reduction of the area available for light emission can reduce the efficiency of light output, as is the case for LCDs, or reduce the brightness and/or lifetime of the display device, as is the case for EL displays. Regardless of whether the area required for patterning busses and control elements competes with the light-emitting area of the display, the decrease in buss and control element size that occur with increases in addressability for a given display generally require more accurate, and therefore more complex, manufacturing processes and can result in greater number of defective panels, decreasing yield rate and increasing the cost of marketable displays. Therefore, from a cost and manufacturing complexity point of view, it is generally advantageous to be able to provide a display with lower addressability. This desire is, of course, in conflict with the need to provide higher apparent resolution. Therefore, it would be desirable to provide a display that has relatively low addressability but that also provides high apparent resolution.

It has been known for many years that the human eye is more sensitive to the spatial frequency of luminance in a scene than to color. In fact, current understanding of the visual system includes the fact that processing is performed within or near the retina of the human eye that converts the signal that is generated by the photoreceptors into a luminance signal, a red/green difference signal and a blue/yellow difference signal. Each of these three signals have a different resolution with the luminance channel having the highest spatial frequency cutoff followed by the red/green spatial frequency cutoff and finally the blue/yellow spatial frequency cutoff. In fact, the cutoff for the luminance channel is nearly twice the spatial frequency cutoff for the red/green difference signal and nearly four times the spatial frequency cutoff of the blue/yellow difference signal.

This difference in sensitivity is well appreciated within the imaging industry and has been employed to provide display devices with high apparent resolution for a reduced addressability. In one example, Takashi et al. in U.S. Pat. No. 5,113,274, entitled "Matrix-type color liquid crystal display device", proposed the use of displays having two green for every red and blue light-emitting element. While such an array of light-emitting elements can perform well for displays with a very high addressability, it is important that the red light-emitting elements typically provide approximately 30 percent of the luminance. Therefore, under certain conditions, such as when displaying flat fields of red, it is possible to see artifacts (e.g., a red and black checkerboard pattern in areas that are intended to be perceived as a flat field red) that occur because of the scarcity of the red light-emitting elements within the array. Therefore, it is important to understand that in displays it is not only the size or the frequency of light-emitting elements that are important to understand the quality of the display device but also the space between the light-emitting elements. In fact, anytime that the distance between any two light-emitting elements of the same color subtends a visual angle greater than 1 minute of arc, it will be possible to see a checkerboard pattern when attempting to display a flat field of color.

It may be additionally desirable to include additional high luminance light-emitting elements. For example, within the field of Organic Light Emitting Diodes (OLEDs), it is known to introduce more than three light-emitting elements where the additional light-emitting elements have higher luminance efficiency, resulting in a display having higher luminance efficiency. Such displays have been discussed by Miller et al. in U.S. Patent Application Publication 2004/0113875, entitled "Color OLED display with improved power efficiency". When applying four or more different colors of subpixels it is then further known to utilize patterns of light-emitting elements having a higher addressability of high luminance white and green light-emitting elements than arrays of low luminance red and blue light-emitting elements as discussed by Miller et al. in U.S. Patent Application 2005/0270444, entitled "Color display with enhanced pixel pattern". Unfortunately, such an arrangement of light-emitting elements can result in the same undesirable checkerboard pattern in the color channels with lower addressability.

It is also known to provide displays having more than one color of high luminance light-emitting element and to use each of these high luminance light-emitting elements to create the high frequency luminance channel. For example, U.S. Patent Application 2005/0225574 and U.S. Patent Application 2005/0225575, each entitled "Novel subpixel layouts and arrangements for high brightness displays" provide various arrangements of light-emitting elements having two colors of high luminance light-emitting elements, such as the white and green light-emitting elements, and to arrange these light-emitting elements such that each row in the arrangement contains all colors of light-emitting elements, making it possible to produce a line of any color using only one row of light-emitting elements. Similarly, every pair of columns within the arrangement discussed within this disclosure contains all colors of light-emitting elements within the display, making it possible to produce a line of any color using only two columns of light-emitting elements. Therefore, when the LCD is driven correctly, it can be argued that the vertical resolution of the device is equal to the inverse of the height of one row of light-emitting elements and the horizontal resolution of the device is equal to the inverse of the width of two columns of light-emitting elements, even though it realistically requires more light-emitting elements than the two light-emitting elements at the intersection of such horizontal and vertical lines to produce a full-color image. However, since each pair of light-emitting elements at the junction of such horizontal and vertical lines contains one high luminance (i.e., white or green) light-emitting element, each pair of light-emitting elements provides a relatively accurate luminance signal within each pair of light-emitting elements, providing a high-resolution luminance signal. It is important to note that in arrangements of light-emitting elements such as these, as well as those discussed by U.S. Pat. No. 5,113,274, the high-luminance light-emitting elements can provide a luminance image with higher addressability than the addressability of any individual color of light-emitting element. As was the case with Takashi and Miller, displays utilizing this pixel pattern will exhibit a checkerboard pattern when a flat field, single color luminance pattern is input.

Although the reduced addressability that can be attained using pixel patterns such as U.S. Pat. No. 5,113,274, U.S. Patent Application 2005/0270444, U.S. Patent Application 2005/0225574 or U.S. Patent Application 2005/0225575 generally reduce the complexity of manufacturing the final display, these patterns also lack uniformity when displaying flat fields of color for any display in which the gap between any two color subpixels of any one color subtends an angle greater than 1 minute of arc on the user's retina. This artifact limits the use of such patterns to displays with an addressability of around 300 full color pixels per inch or greater. Displays with lower resolution will provide objectionable levels of the checkerboard artifact when viewed from some typical viewing distance. This is particularly troubling when attempting to apply these techniques in larger displays which are generally designed to have a lower addressability because they are typically viewed from a larger viewing distance. However because these displays can be viewed from near viewing distances and often are viewed from near viewing distances by individuals making purchasing decisions on show room floors, the artifacts that occur in images generated on such arrangements of light-emitting elements makes the use of such pixel patterns on larger displays impractical.

Artifact reduction using arrangements of light-emitting elements such as the "RGB delta" pattern has been taught, for example by Noguchi et al. in U.S. Pat. No. 4,969,718, that are enabled by splitting the subpixel electrodes into equal halves. However in this case the split is done solely to solve electrical problems associated with the RGB delta pattern, and the split electrodes drive identical colors and remain juxtaposed.

It is also known in the art to correct for image degradation (e.g., avoid flicker in LCD displays) by localizing the degradation on dark-colored, or low luminance subpixels, as taught in U.S. Patent Application 2005/0083277A1. It is taught therein that successive pairs of blue columns may share the same column driver through an interconnect, however the row selection mechanisms are independent, and the TFT's of the blue subpixels are remapped to avoid sharing of exact data values.

There is therefore a need to provide an enhanced arrangement of light-emitting elements, such as the ones described within this background, that require a minimum number of drive circuits and that enable the use of even lower addressabilities on full color displays. Specifically, it is desired to provide such an enhanced arrangement of light-emitting elements in displays having an addressability of less than 300 pixels per inch without creating the perception of non-uniformity within areas of an image that are intended to have a uniform color.

SUMMARY OF THE INVENTION

In accordance with one embodiment, the invention is directed towards a display with improved visual uniformity, comprised of an array of independently-addressable light-emitting elements, including at least a first independently-addressable light-emitting element for producing a first color of light and a second independently-addressable light-emitting element for producing a second color of light; wherein at least the first independently-addressable light-emitting element is subdivided into at least two spatially separated commonly-addressed light-emitting areas and wherein at least a portion of the second independently-addressable light-emitting element is positioned between the spatially separated commonly-addressed light-emitting areas of the first independently-addressable light-emitting element.

DETAILED DESCRIPTION OF THE INVENTION

Figure 1:
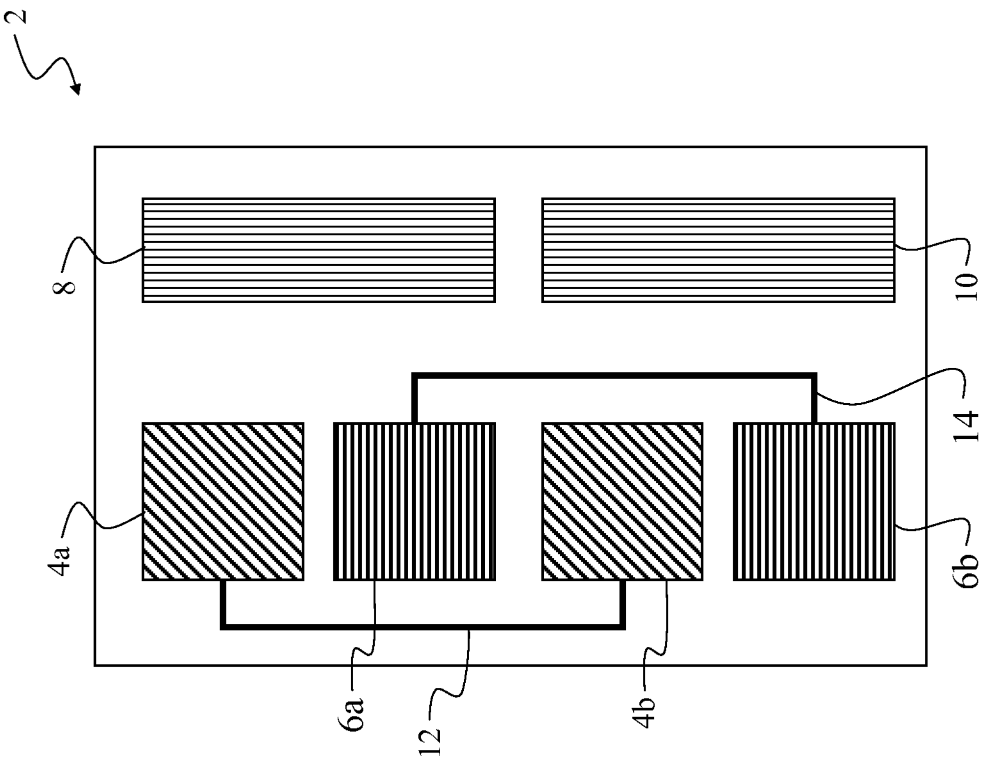
FIG. 1 is a schematic diagram showing an arrangement of light-emitting elements for emitting at least three colors of light according to an embodiment of the present invention.

As shown in FIG. 1, a display 2 with improved visual uniformity in accordance with an embodiment of the invention is comprised of an array of independently-addressable, light-emitting elements 4*a*/4*b*, 6*a*/6*b*, 8, 10, including at least a first independently-addressable, light-emitting element 4*a*/4*b* for producing a first color of light and a second independently-addressable, light-emitting element 6*a*/6*b* for producing a second color of light; wherein at least the first independently-addressable, light-emitting element 4*a*/4*b* is subdivided into at least two spatially separated commonly-addressed light-emitting areas 4*a* and 4*b* and wherein at least a portion 6*a* of the second light-emitting element 6*a*/6*b* is positioned between the spatially separated commonly-addressed light-emitting areas 4*a* and 4*b* of the first independently-addressable, light-emitting element 4*a*/4*b*. Although a display of the present invention may be comprised of only two light-emitting elements for emitting two colors of light, the display will preferably be a full-color display that is comprised of an array of light-emitting elements for emitting at least three different colors of light; including, e.g., light-emitting elements 4*a*/4*b* for emitting red, 6*a*/6*b* for emitting blue and 8 and 10 for emitting green colors of light.

To fully appreciate the present invention, it is necessary to define low and high luminance light-emitting elements. Within the present invention, the term "high luminance light-emitting element" is defined as a light-emitting element that has a peak output luminance value that is 40 percent or greater of the peak white luminance of the display device while a "low luminance light-emitting element" is a light-emitting element with a peak output luminance value less than 40 percent of the peak white luminance of the display device. Within a display comprised of at least red, green, and blue light-emitting elements, the red and blue light-emitting elements will typically be low luminance light-emitting elements while the green light-emitting element will be a high luminance light-emitting element. In displays further comprised of broadband or multi-band light-emitting elements, such as white, yellow, or cyan these broadband or multi-band light-emitting elements will be high-luminance light-emitting elements.

As described above, at least the first independently-addressable light-emitting element is subdivided into at least two spatially separated commonly-addressed light-emitting areas. For purposes of the invention, such spatially separated commonly-addressed light-emitting areas of a single independently addressable light-emitting element may conveniently be referred to as commonly addressed "portions" of the light emitting element, or as commonly addressed "sub-elements" of the independently addressable light-emitting element.

As used within this disclosure, the phrase "commonly addressed" refers to an arrangement in which two light emitting areas of a light emitting element are electrically connected in a manner such that they are not independently controllable. That is, the commonly addressed light emitting areas share the same select and drive lines, so that both necessarily receive the same input or driving signal.

As used within this disclosure, the phrase "positioned between" refers to a physical arrangement in which at least a portion of a second light-emitting element is interspersed with at least two spatially separated, commonly addressed light-emitting areas of a first light-emitting element, such that a line drawn between at least one point in one area of the first element and at least one point in another area of the first element intersects a portion of the second element. Because the patterns of the present invention often involve the arrangement of first and second elements within a rectilinear grid, often with inactive area for providing electronics, it is often impractical to place an element such that the centroid of a portion of the second element is geometrically between the center of mass of two portions of the first element. Therefore, the term "positioned between" will include arrangements in which multiple portions of the first element are located in separate rows or columns and a portion of the second element is located in the same row or column as one of the portions of the first element, but also in a row or column that is between the separate rows or columns which contain the portions of the first light-emitting element.

FIG. 1 depicts a portion of a display comprised of one group of three colors of light-emitting elements, which may be repeated across the entire display to form a mosaic of light-emitting elements. Within this figure, a first independently-addressable light-emitting element for producing a first color of light 4 is comprised of two commonly-addressed sub-elements 4*a* and 4*b*. Further, a second independently-addressable light-emitting element 6 for producing a second color of light is further composed of two commonly-addressed sub-elements 6*a* and 6*b*. In accordance with this invention at least a portion 6*a* of the second independently-addressable light-emitting element is positioned between the commonly-addressed sub-elements 4*a* and 4*b* of the first independently addressable light-emitting element 4. Further, this repeating group of light-emitting elements within the array is additionally comprised of two further independently-addressable light-emitting elements 8, 10 for emitting at least a third color of light.

As shown in FIG. 1, when the two further independently-addressable light-emitting elements 8, 10 for emitting at least a third color of light each emit the same color of light, the display array of light-emitting elements includes one of the first independently addressable light-emitting element for each second independently-addressable light-emitting element. Further, there are two independently-addressable light-emitting elements 8, 10 for emitting at least a third color of light for every first or second independently-addressable light-emitting element. That is, the display is comprised of fewer of one color of light-emitting element 4, 6 than another color of light-emitting element 8, 10. Under these conditions, it is desirable for the color of light-emitting elements that are fewer in number 4, 6 to be comprised of multiple sub-elements 4*a*, 4*b* and 6*a*, 6*b*. These sub-elements are placed in electrical contact with each other as indicated by the connections 12, 14, such that the two sub-elements are commonly-addressed. While the sub-elements may have the substantially the same or different light-emitting areas, in a preferred embodiment they are substantially the same areas such that they provide substantially the same luminance when activated. In displays of this type, the fact that the display has fewer of some colors of light-emitting elements (e.g., red 4, blue 6) than another color of light-emitting element (e.g., green 8, 10) implies that the average space between these light-emitting elements will be larger than the space between the light-emitting elements of other colors, which are greater in number. By forming each of the light-emitting elements that are fewer in number from multiple sub-elements, the average space between sub-elements of these colors of light-emitting elements may be reduced, providing improved uniformity. It should be noted that typically, the colors of light-emitting elements that are fewer in number will be low luminance light-emitting elements (eg., red and blue) since the numbers of these light-emitting elements may often be reduced without degrading the perceived sharpness of the display. However, in these same displays the colors of light-emitting elements 8, 10 which are greater in number, will be composed of a single light-emitting region, the light-emitting element that is not divided into multiple sub-elements. These colors of light-emitting elements will typically correspond to high luminance light-emitting elements such as green or white. In such a display configuration, the presence of the larger number of independently-addressable high luminance light-emitting elements is important to maintain the perceived sharpness of the visual display. For the reasons cited, a display of the present invention preferably has different numbers of light-emitting elements for emitting different colors of light, having fewer low luminance light-emitting elements 4, 6 at least one of which is formed from multiple sub-elements, than high luminance light-emitting elements 8, 10.

Ideally, the formation of light-emitting elements, which are composed of multiple sub-elements, will insure that the largest distance between two light-emitting regions (i.e., sub-elements or single light-emitting regions which comprise a light-emitting element) emitting light of a single color will be less than 1 minute of arc when the display is viewed from any reasonable viewing distance. This requirement insures that when a flat field of an individual color is shown on the display, the display will appear to be uniform in luminance rather than exhibiting spatial artifacts, such as a visible checkerboard pattern. Since any display may reasonably be viewed from distances of 16 inches or less, the invention will be preferably applied in displays having an addressability of 300 pixels per inch or less and more preferably in displays having an addressability of 200 pixels per inch or less. It might be noted that at these resolutions and a viewing distance of 16 inches, the visual angle of a pixel of a 300 pixel per inch display is just under 0.8 minutes of arc and the visual angle of a pixel on a 200 pixel per inch display is approximately 1.1 minutes of arc.

Figure 2:
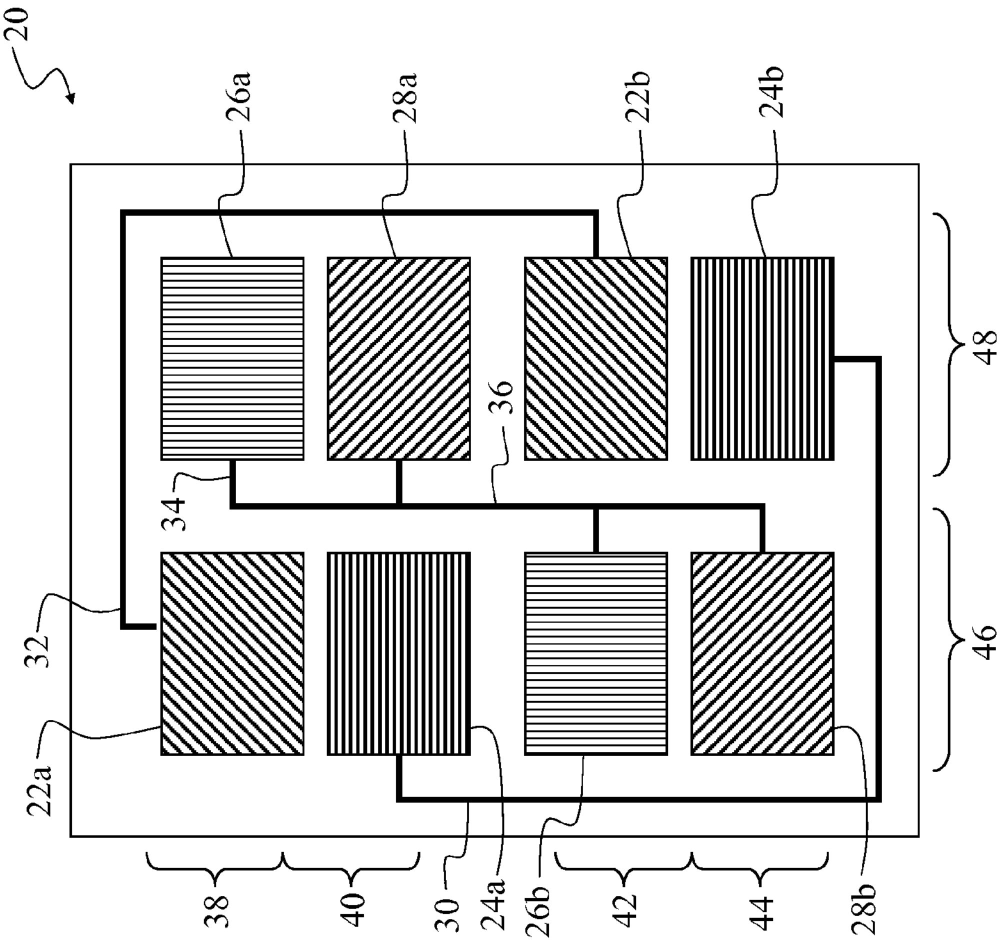
FIG. 2 is a schematic diagram showing an arrangement of light-emitting elements for emitting at least four colors of light according to an embodiment of the present invention.

In another embodiment shown in FIG. 2, a portion of a full color display 20 contains an array of four independently-addressable, light-emitting elements 22, 24, 26, 28, for producing four different colors of light, each light-emitting element comprised of two commonly-addressed sub-elements a, b. In one desirable configuration, each of the independently-addressable light-emitting elements in the array of four light-emitting elements may contain two commonly-addressed sub-elements 22*a*, 22*b* which together form an independently-addressable light-emitting element 22 for emitting red light, two commonly-addressed sub-elements 24*a*, 24*b* which together form an independently-addressable light-emitting element 24 for emitting white light, two commonly-addressed sub-elements 26*a*, 26*b* which together form an independently-addressable light-emitting element 26 for emitting green light, and two commonly-addressed sub-elements 28*a*, 28*b* which together form an independently addressable light-emitting element 28 for emitting blue light.

As shown in FIG. 2, these sub-elements are arranged in two columns 46, 48 and four rows 38, 40, 42, 44. Within this embodiment, one of the two commonly addressed sub-elements which form each of the four independently-addressed light-emitting elements are positioned in different columns of the array of light-emitting elements and are separated by at least one row. Note that at least one of the sub-elements for a different one of the four independently-addressable light-emitting elements are located in the intervening row. For example, the red independently-addressable light-emitting element 22 is composed of a sub-element 22*a* within the first row 38 of sub-elements and a sub-element 22*b* in the third row 42 of sub-elements. One of these sub-elements 22*a* is located in the first column of sub-elements 46 while the other 22*b* is located in the second column 48 of sub-elements. Notice that the sub-elements 24*a* and 28*a* are located in the row 40 between the two commonly addressed sub-elements 22*a*, 22*b*, and in the same columns 46, 48 as one of the commonly addressed sub-elements 22*a*, 22*b* which compose the independently-addressable light-emitting element 22 and are thus between the commonly addressed sub-elements 22*a*, 22*b*, which compose the independently-addressable light-emitting element. 22. In fact, within this embodiment, one of the sub-elements is located between any of the pair of commonly addressed sub-elements, which comprise an independently-addressable light-emitting element. Therefore, by defining any of these light-emitting elements as the first independently-addressable light-emitting element for emitting a color of light and any other of the independently-addressable light-emitting elements as the second independently-addressable light-emitting element for emitting a different color of light at least the first and second independently addressable light-emitting elements for emitting different colors of light are subdivided into at least two sub-elements. Notice further that the red and blue independently-addressable light-emitting elements 22, 28 will typically be low luminance light-emitting elements while the green and white independently-addressable light-emitting elements 26, 24 will typically be high luminance light-emitting elements.

Figure 3:
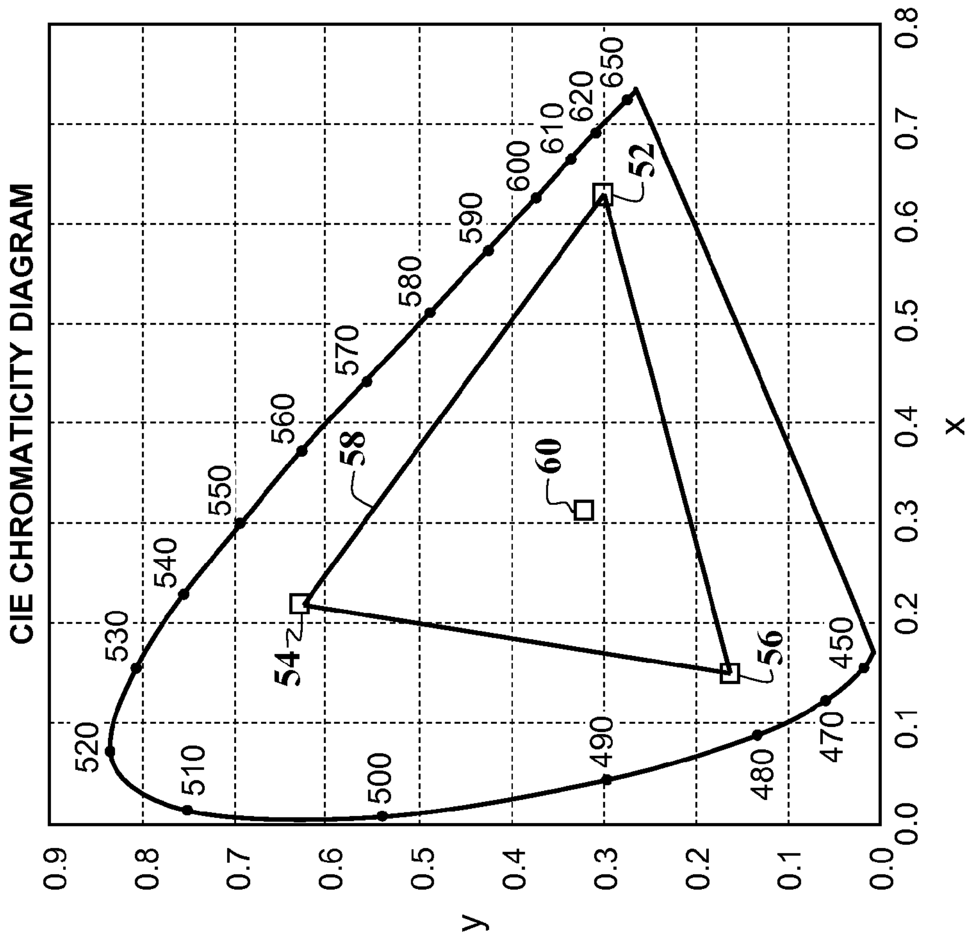
FIG. 3 is a CIE chromaticity diagram depicting the chromaticity coordinates for red, green, blue and white light-emitting elements according to an embodiment of the present invention.

Within this embodiment, the commonly-addressed sub-elements may be electrically connected to form each independently-addressable light-emitting element. The connecting lines 30, 32, 34, 36 represent electrical connections for connecting each of the commonly-addressed sub-elements together. Generally, when the present invention is implemented within an active-matrix display, it will be preferred that an active matrix circuit will be provided to supply power to each independently-addressable light-emitting element and this same circuit will be connected to each of the commonly addressed sub-elements directly or that an electrical connection may be formed between the two sub-elements to allow power to be provided from one circuit to the commonly-addressed sub-elements within each light-emitting element. As stated earlier, the independently-addressable light-emitting elements of FIG. 2 are comprised of an array of light-emitting elements for emitting at least three different colors of light, including red, green, blue and white light. Example CIE 1931 chromaticity coordinates for red 52, green 54, and blue 56 light emission are shown in FIG. 3. Notice that the chromaticity coordinates of any red, green, and blue light-emitting element will form a triangle 58 in chromaticity space, which is typically referred to as the color gamut of a display employing light-emitting elements which emit light having these chromaticity coordinates. Further, the chromaticity coordinates 60 of the white light-emitting element will lie near the center of this color gamut triangle 58 and will therefore emit a color that is inside the color gamut defined by the chromaticity coordinates of the red, green, and blue colors of light.

A full color display employing the array of four light-emitting elements 22, 24, 26, 28 in FIG. 2 may be formed by simply tiling this array across the entire display. However, it should be recognized that this array may be rotated, mirrored, flipped and/or transposed as it is tiled along either dimension of the display. In fact, in a preferred embodiment, this array will be rotated 180 degrees to form a tile that may be used to populate the arrays within the neighboring horizontal and vertical locations within the display.

When rendering information on displays having commonly-addressed sub-elements as shown in the previous patterns, the apparent uniformity of the display will be significantly improved. However, by increasing the extent of the elements, it is possible that when presenting images on such displays, the apparent sharpness of the display may, under certain conditions, be reduced slightly. This loss of apparent sharpness may be overcome when spatially separated commonly-addressed light emitting areas are arranged to be aligned along two or more dimensions of the display. That is, the loss of sharpness can be reduced when the spatially separated commonly-addressed light emitting areas of at least one of the independently-addressable light emitting element lie substantially along a first dimension, and the spatially separated commonly-addressed light emitting areas of at least one other independently-addressable light emitting element lie substantially along a second dimension of the display. One embodiment of such arrangement of light-emitting elements is depicted in FIG. 8.

Figure 8:
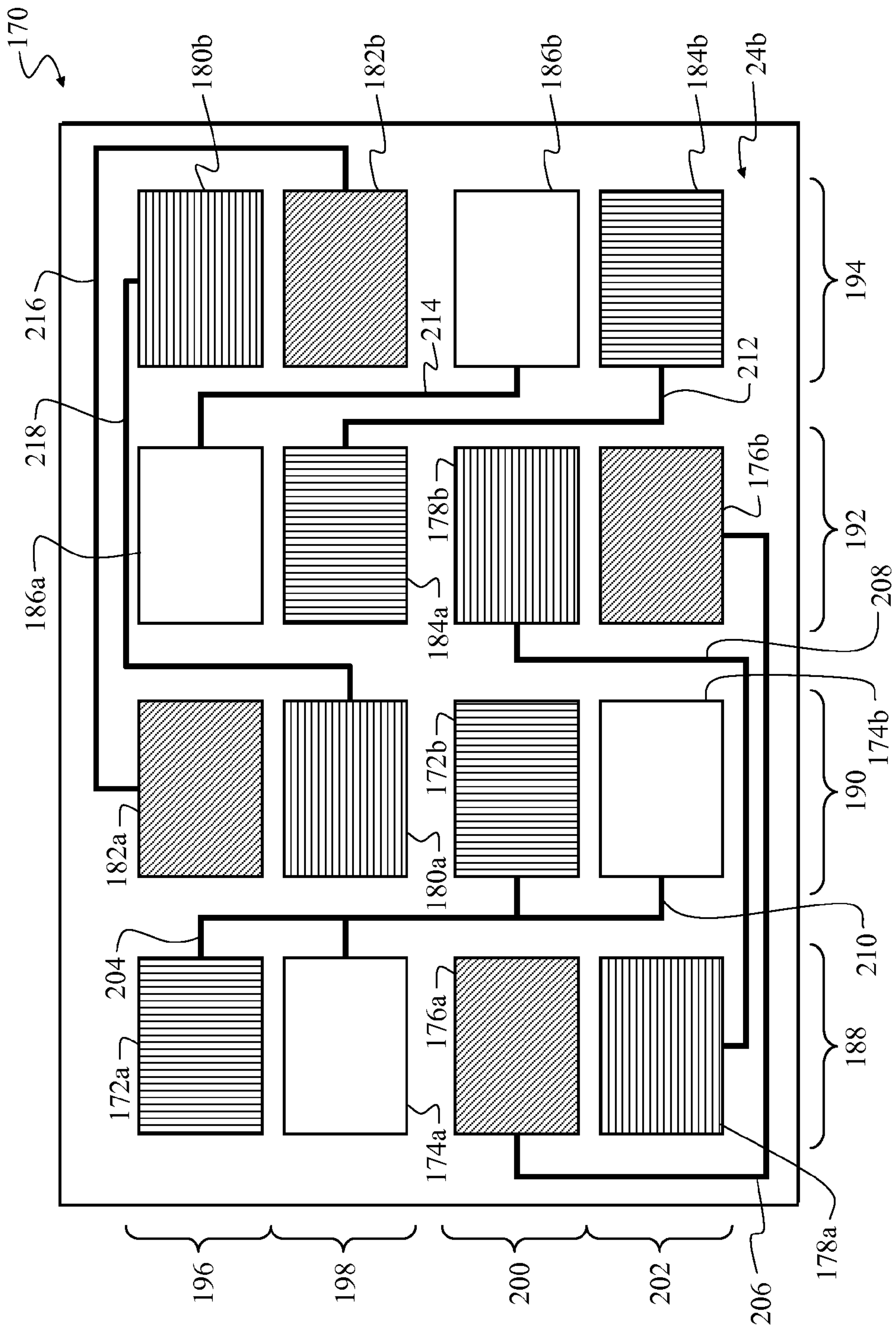
FIG. 8 is a schematic diagram showing an arrangement of light-emitting elements for emitting at least four colors of light according to an embodiment of the present invention.

FIG. 8 shows a portion of a full color display 170 containing an array of eight independently-addressable, light-emitting elements 172, 174, 176, 178, 180, 182, 184, 186, for producing four different colors of light, each light-emitting element comprised of two commonly-addressed sub-elements a, b. In one desirable configuration, the depicted portion of the display comprising an array of eight light-emitting elements may contain two independently-addressable, light-emitting elements of each of four colors. As shown in FIG. 8, the two independently-addressable light-emitting elements 172, 184 for emitting red light each consist of two commonly-addressed sub-elements. The independently-addressable light-emitting element 172 consists of the two commonly addressed sub-elements 172*a* and 172*b* connected by connecting line 204 while the independently-addressable light-emitting element 184 consists of the two commonly addressed sub-elements 184*a* and 184*b* connected by connecting line 212. The two independently-addressable light-emitting elements 176, 182 for emitting green light each consist of two commonly-addressed sub-elements. The independently-addressable light-emitting element 176 consists of the two commonly addressed sub-elements 176*a* and 176*b* connected by connecting line 206 while the independently-addressable light-emitting element 182 consists of the two commonly addressed sub-elements 182*a* and 182*b* connected by connecting line 216. The two independently-addressable light-emitting elements 174, 186 for emitting white light each consist of two commonly-addressed sub-elements. The independently-addressable light-emitting element 174 consists of the two commonly addressed sub-elements 174*a* and 174*b* connected by connecting line 210 while the independently-addressable light-emitting element 186 consists of the two commonly addressed sub-elements 186*a* and 186*b* connected by connecting line 214. Finally, the two independently-addressable light-emitting elements 178, 180 for emitting blue light each consist of two commonly-addressed sub-elements. The independently-addressable light-emitting element 178 consists of the two commonly addressed sub-elements 178*a* and 178*b* connected by connecting line 208 while the independently-addressable light-emitting element 180 consists of the two commonly addressed sub-elements 180*a* and 180*b* connected by connecting line 218.

As shown in FIG. 8, these sub-elements are arranged in four columns 188, 190, 192, 194 and four rows 196, 198, 200, 202. Within this embodiment, at least one of the two commonly addressed sub-elements which form one of the independently-addressed light-emitting elements are positioned in different columns of the array of light-emitting elements and are separated by at least one column. Note that at least one of the sub-elements for a different one of the independently-addressable light-emitting elements are located in the intervening column. Additionally, at least one of the two commonly addressed sub-elements which form one of the independently-addressed light-emitting elements are positioned in different rows of the array of light-emitting elements and are separated by at least one row. Note that at least one of the sub-elements for a different one of the independently-addressable light-emitting elements are located in the intervening row. For example, the red independently-addressable light-emitting element 172 is composed of a sub-element 172*a* within the first row 196 of sub-elements and a sub-element 172*b* in the third row 200 of sub-elements. One of these sub-elements 172*a* is located in the first column of sub-elements 188 while the other 172*b* is located in the second column 190 of sub-elements. Notice that the sub-elements 174*a* and 180*a* are located in the row 198 between the two commonly addressed sub-elements 172*a*, 172*b*, and in the same columns 188, 190 as one of the commonly addressed sub-elements 172*a*, 172*b* which compose the independently-addressable light-emitting element 172 and are thus between the commonly addressed sub-elements 172*a*, 172*b*, which compose the independently-addressable light-emitting element. 172. Further, the blue independently-addressable light-emitting element 180 is composed of a sub-element 180*a* within the second column 190 of sub-elements and a sub-element 180*b* in the fourth column 194 of the array of light-emitting elements. The sub-elements 184*a* and 186*a* are positioned on the same rows as 182*a* and 182*b* but are located in the column 192 between the commonly addressed sub-elements 180*a* and 180*b*. In this example, the commonly addressed sub-elements. As such, the spatially separated commonly-addressed light emitting areas 172*a*, 172*b* of at least one of the independently-addressable light emitting elements 172 lie substantially along a first dimension defined by the direction of the columns of light-emitting elements, and the spatially separated commonly-addressed light emitting areas 180*a*, 180*b* of at least one other independently-addressable light emitting element 180 lie substantially along a second dimension of the display. In this particular embodiment, the two independently-addressable light emitting elements 172, 180 each emit a different color of light but they may also emit the same color of light.

It should be further noted, that in such a display, it is preferable that the incoming data be processed to be sensitive to the presence and directions of edges within the images that are to be displayed. Specifically, the processing method should determine the location of edges within the input data. When an edge is detected, its direction should be determined and the incoming data should be processed to form the final image such that the independently-addressable light-emitting elements whose separated commonly-addressed light emitting areas lie along a direction that is most similar to the direction of the edge within the incoming data are preferentially driven to higher drive values than independently-addressable light-emitting elements whose separated commonly-addressed light emitting areas lie along a different direction.

Figure 4:
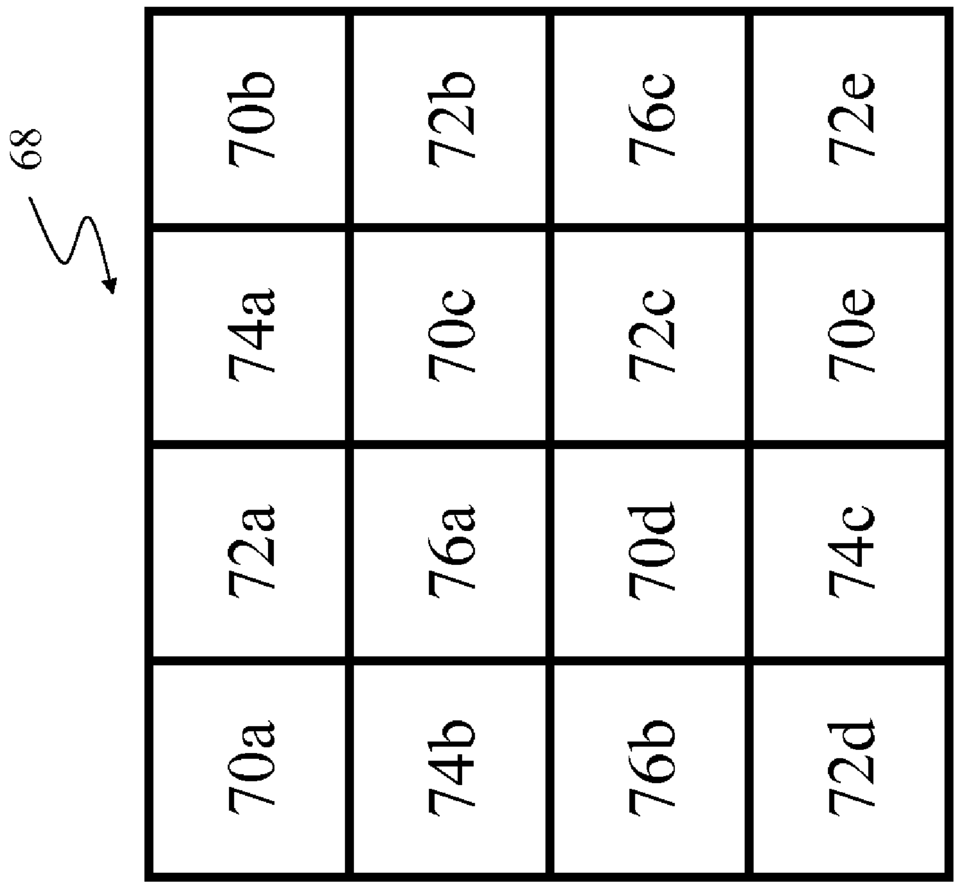
FIG. 4 is a schematic diagram showing an arrangement of light-emitting elements for emitting at least four colors of light according to an embodiment of the present invention.

In another embodiment shown in FIG. 4, one array of sub-elements that represents a repeating pattern of sub-elements which form a portion 68 of a display is shown that contains four light-emitting elements 70, 72 74 and 76, each of which emits a different color of light, and each of which is divided into sub-elements. In this case the number of sub-elements per light-emitting element is unequal. For example, the first colored independently-addressable light-emitting element 70 is comprised of five commonly-addressed, sub-elements 70*a*, 70*b*, 70*c*, 70*d*, 70*e*. The second independently-addressable light-emitting element 72 is comprised of five sub-elements 72*a*, 72*b*, 72*c*, 72*d*, and 72*e*, the third independently-addressable light-emitting element 74 is comprised of three sub-elements 74*a*, 74*b*, 74*c*, and the fourth independently-addressable light-emitting element 76 has three sub-elements 76*a*, 76*b*, 76*c*. The relative number of sub-elements per colored light-emitting element, as compared to the other colored light-emitting elements, may be chosen based on consideration of any number of factors, including the spectral content and apparent brightness of each colored emitter, the luminous efficiency of these emitters, or the expected lifetime of these emitters. It will be noted that the sub-elements are arrayed in an irregular pattern(i.e., has no obvious geometrical order). The arrangement of the sub-elements may be regular or irregular, and furthermore may be chosen randomly or algorithmically, with the constraint that the sub-elements of each of the four light-emitting elements are interspersed among themselves so as to ensure that the largest distance between two sub-elements of a single color will be less than 1 minute of arc when the display is viewed from any reasonable viewing distance. A pattern such as that in the portion of a display shown in FIG. 4 may be repeated throughout the display or may be varied throughout the display. Further, commonly-addressed sub-elements need not be constrained by rectangular boundaries as shown, but may be intertwined.

As illustrated by this embodiment, several commonly-addressed sub-elements may be used to compose a single independently-addressable light-emitting element. The fact that each of these independently-addressable light-emitting elements may require only one circuit to drive the entire group of sub-elements which comprise this light-emitting element relaxes the constraint on the number of individual light-emitting sub-elements within a display, as it is often the size of the circuitry required to drive any sub-element which constrains the number of sub-elements. For this reason, it is important to discuss an active matrix embodiment of this invention in more detail. The basic concept of the present disclosure may be applied using any display technology, including displays that actively produce light. Such displays may include technologies that modulate light from a large area light source, including technologies such as liquid crystal displays. However, this invention will preferably be provided in emissive displays such as electroluminescent displays.

Within this disclosure, relevant electroluminescent display technologies include those employing stacks of organic materials, typically referred to as Organic Light Emitting Diode or OLED displays. The structure of an OLED typically comprises, in sequence, an anode, an organic electroluminescent (EL) medium, and a cathode, which are deposited upon a substrate. The organic EL medium disposed between the anode and the cathode is commonly comprised of an organic hole-transporting layer (HTL) and an organic electron-transporting layer (ETL). Holes and electrons recombine and emit light in the ETL near the interface of HTL/ETL. Tang et al., "Organic electroluminescent diodes", *Applied Physics Letters,* 51, 913 (1987), and U.S. Pat. No. 4,769,292, demonstrated highly efficient OLEDs using such a layer structure. Since then, numerous OLEDs with alternative layer structures have been disclosed. For example, there are three-layer OLEDs that contain an organic light-emitting layer (LEL) between the HTL and the ETL, such as that disclosed by Adachi et al., "Electroluminescence in Organic Films with Three-Layer Structure", *Japanese Journal of Applied Physics,* 27, L269 (1988), and by Tang et al., "Electroluminescence of doped organic thin films", *Journal of Applied Physics,* 65, 3610 (1989). The LEL commonly includes a host material doped with a guest material wherein the layer structures are denoted as HTL/LEL/ETL. Further, there are other multi-layer OLEDs that contain a hole-injecting layer (HIL), and/or an electron-injecting layer (EIL), and/or a hole-blocking layer, and/or an electron-blocking layer in the devices. While the subsequent embodiments will be provided with respect to OLED display, it will be well understood by those skilled in the art that this same invention may readily be applied to EL displays which include coatable inorganic materials or combinations of organic and inorganic materials, which may be coated onto an active or passive matrix backplane. One such display technology employs a light-emitting layer formed from quantum dots as described in co-pending U.S. Ser. No. 11/226,622 filed Sep. 14, 2005, entitled "Quantum Dot Light Emitting Layer", the disclosure of which is herein incorporated by reference.

Figure 5:
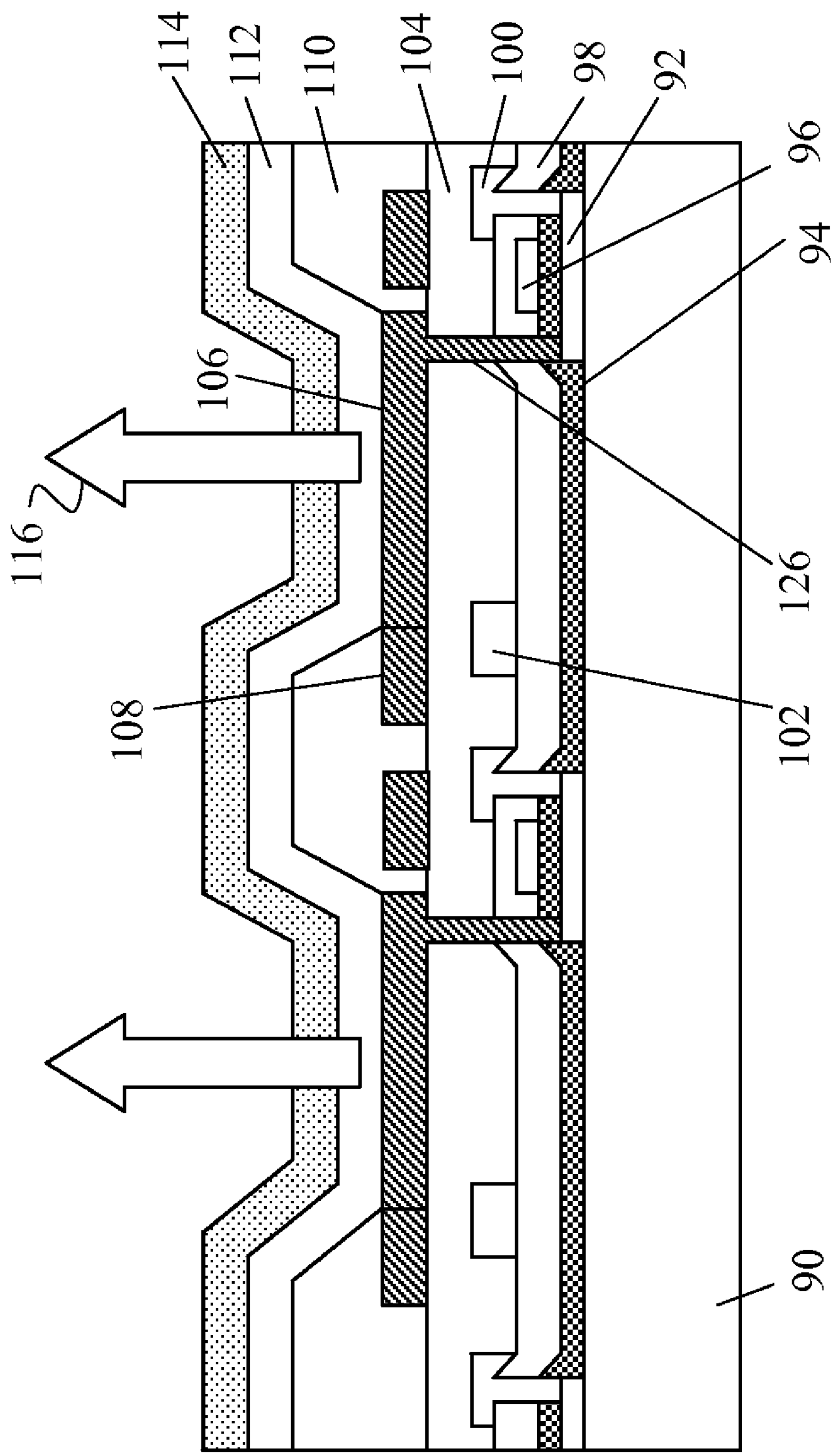
FIG. 5 is a cross-sectional diagram of an active-matrix, top-emitting OLED display according to an embodiment of the present invention.

Herein, a particular embodiment employing an active-matrix, top-emitting organic light emitting diode (OLED) display will be provided, the structure of which is shown in FIG. 5. As shown, the active-matrix, top-emitting OLED display is typically formed on a substrate 90. This substrate generally provides an underlying structure on which the display may be formed and may be composed of various materials, such as glass, metal foil or any other material. Active matrix circuitry is then constructed on this substrate 90. As shown in this figure, the active matrix circuitry, which includes a TFT formed from a semiconductor active layer 92, a gate dielectric layer 94, and a gate conductor 96. A first insulating layer 98 is then formed over the gate conductor 96. A power line 100 is then formed and connected to the source of the TFT. A signal or data line 102 is formed typically in the same step. Although not shown within this cross-sectional view, at least a select TFT and capacitor may be formed on the substrate, which allows a data signal that is provided on the data line to regulate the voltage of the gate conductor 96, to regulate the power across the TFT. A second insulating layer 104 is then formed over the active matrix circuitry. A first electrode 106 is then formed such that it is contact with the semiconductor active layer 92 wherein the connection is typically formed through a via 126. Note that this first electrode is typically patterned to form electrode segments, which spatially define individual regions of light emission. Also shown in this embodiment are connector segments 108, which allow electrical connection to be formed between sub-elements of each segment of the first electrode. Note that in this embodiment, these connector segments 108 are typically patterned from the same material as the first electrode 106. An inter-pixel dielectric 110 is then formed to occlude the area between the first electrode 106 segments and to allow the successive layers to be formed as uniform coatings. A stack of organic electro-luminescent materials is then deposited over the inter-pixel dielectric 110 and the first electrode 106 to form an organic electro-luminescent material layer 112. Finally, a second electrode 114 is formed over the organic electro-luminescent materials. When the electro-luminescent materials 112 are stimulated by an electric field between the first 106 and second 114 electrodes, light 116 is produced and propagates through the second electrode to the viewer.

In this embodiment, it should be noted that in addition to providing a layer that allows uniform coating of the organic electro-luminescent materials 112 and the second electrode 114, the inter-pixel dielectric 110 also prevents contact of the connector segments 108 with the electro-luminescent materials 112 or the second electrode 114 such that light emission will not occur in the area of the connector segments 108. Therefore, while light emission 116 will occur over the area of each segment of the first electrode 106, light will not be emitted in the areas that are defined by the connector segments 108.

Figure 6:
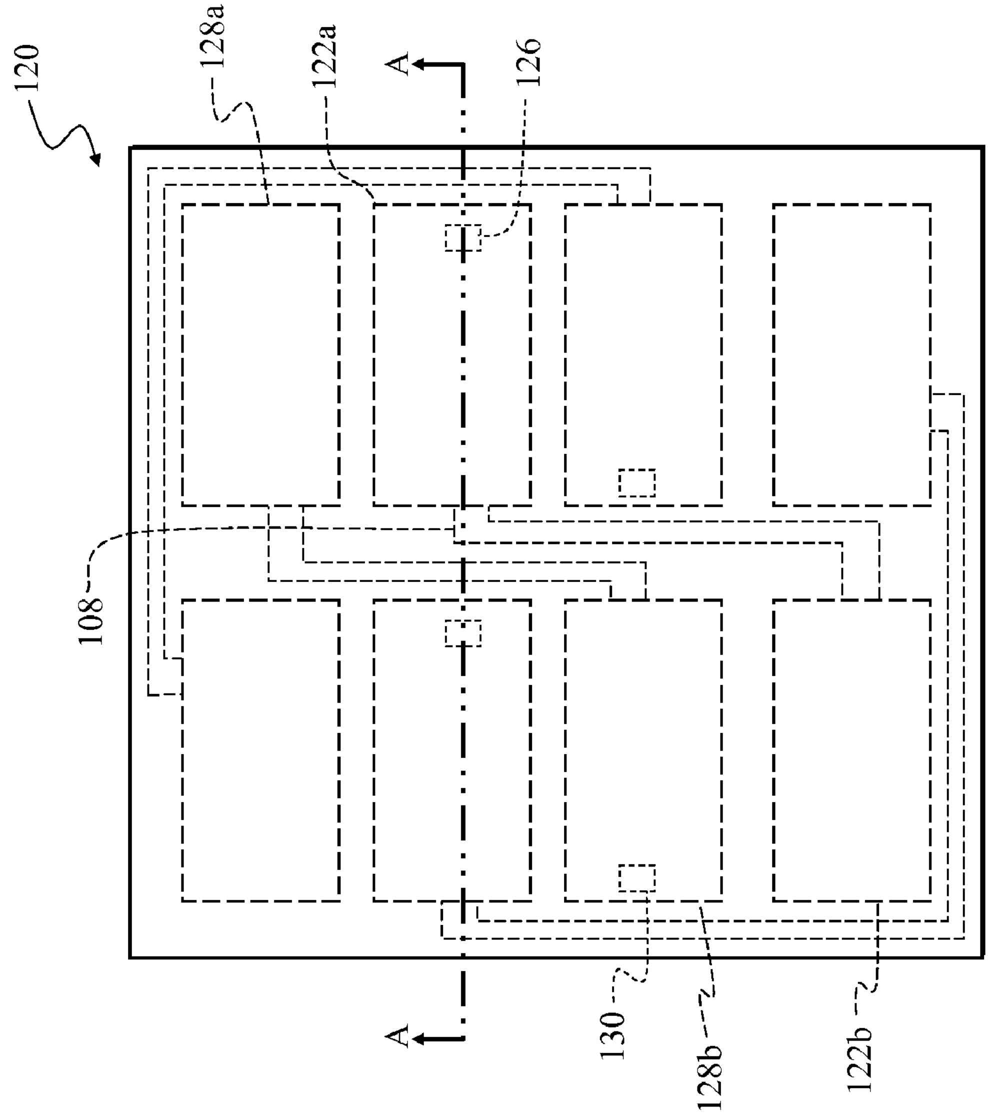
FIG. 6 is a plan view of the first electrode layer for an active-matrix, top-emitting OLED display according to an embodiment of the present invention.

A representation of a portion 120 of the top view of the layer forming the first electrode 106 and connector segment layer 108 is shown in FIG. 6 that corresponds to the cross sectional view shown in FIG. 5. As shown in this figure, the line A-A designates the cross sectional line from which the cross-sectional view of FIG. 5 was drawn. Note that an independently-addressable light-emitting element is formed between this first electrode layer and the second electrode within this display configuration. Further, within this embodiment, this independently-addressable light-emitting element is defined by a segment of the first electrode layer which is connected to the active matrix circuit, specifically the semiconductor active layer 92 of a TFT on the substrate. As shown in FIG. 6, this connection is formed through the via 126. Therefore, an independently-addressable light-emitting element in this embodiment is formed from a pair of electrodes, at least one of which is patterned to form electrode segments which spatially define sub-elements 122*a*, 122*b*, separated by a medium, specifically a organic electro-luminescent material layer 112, that is in electrical contact with the pair of electrodes and that is stimulated to produce light. Within this embodiment, a connector segment 108 electrically connects the electrode segments of the sub-elements to each other. Further note that within this particular embodiment, for each pair of independently-addressable light-emitting elements 122, 128, there are two vias 126, 130 which connect these independently-addressable light-emitting elements to an active matrix circuit even though there are effectively four sub-elements 122*a*, 122*b*, 128*a*, and 128*b* providing light emission. Therefore, there is a need for only two circuits to provide a signal to these four sub-elements. This embodiment is, therefore, particularly advantaged when the minimum size of the light-emitting elements are limited by the area required for creation of each circuit to drive each independently addressable light-emitting element. Typically, this condition will occur when larger circuits which employ more than two TFTs and one capacitor are required to compensate for voltage threshold shifts or mobility differences of the TFTs as discussed by U.S. patent application Ser. No. 11/312,016, entitled “Display device and driving method thereof”, U.S. Pat. No. 7,023,408 entitled “Pixel circuit for active matrix OLED and driving method”, and U.S. Pat. No. 6,847,340 entitled “Active organic light emitting diode drive circuit”, the disclosures of all of which are hereby incorporated by reference.

Note that within this embodiment, the display may be a color display having three or more differently colored light-emitting elements. In one embodiment, different organic electro-luminescent materials may be deposited on the electrode segments that produce the different independently addressable light-emitting elements. However, in another embodiment, an encapsulating glass may be placed above the second light-emitting layer to provide a transparent protective layer. Further, color change materials may be deposited on top of the electrode or color filters may be deposited on the inside of the encapsulating glass to provide a full color display without patterning organic electro-luminescent materials within the display structure. Note that regardless of where the color filter or color change materials are placed, different materials will generally be aligned such that the light that is emitted by the various sub-elements 122*a*, 122*b* that form an independently-addressable light-emitting element will be affected to provide the user with the same color of light.

It is also possible to provide passive matrix embodiments of the present invention. Typical passive matrix displays are comprised of a first electrode that is typically formed from horizontal lines of a material to form electrode rows. The active materials, i.e., emissive or modulating, are then placed over this first layer and a second electrode layer is formed as vertical lines of material to form electrode columns. An independently addressable light-emitting element is then formed at the intersection of a row and column electrode such that when an electric field is created between them, the light-emitting element produces or modulates light.

Within the current invention, at least a first independently-addressable light-emitting element is subdivided into at least two commonly-addressed sub-elements and a portion of the second independently-addressable light-emitting element is positioned between the commonly-addressed sub-elements of the first independently-addressable light-emitting element. Within a passive matrix embodiment, this may be accomplished by creating a row or column electrode that intersects the remaining electrode at two locations rather than one.

Figure 7:
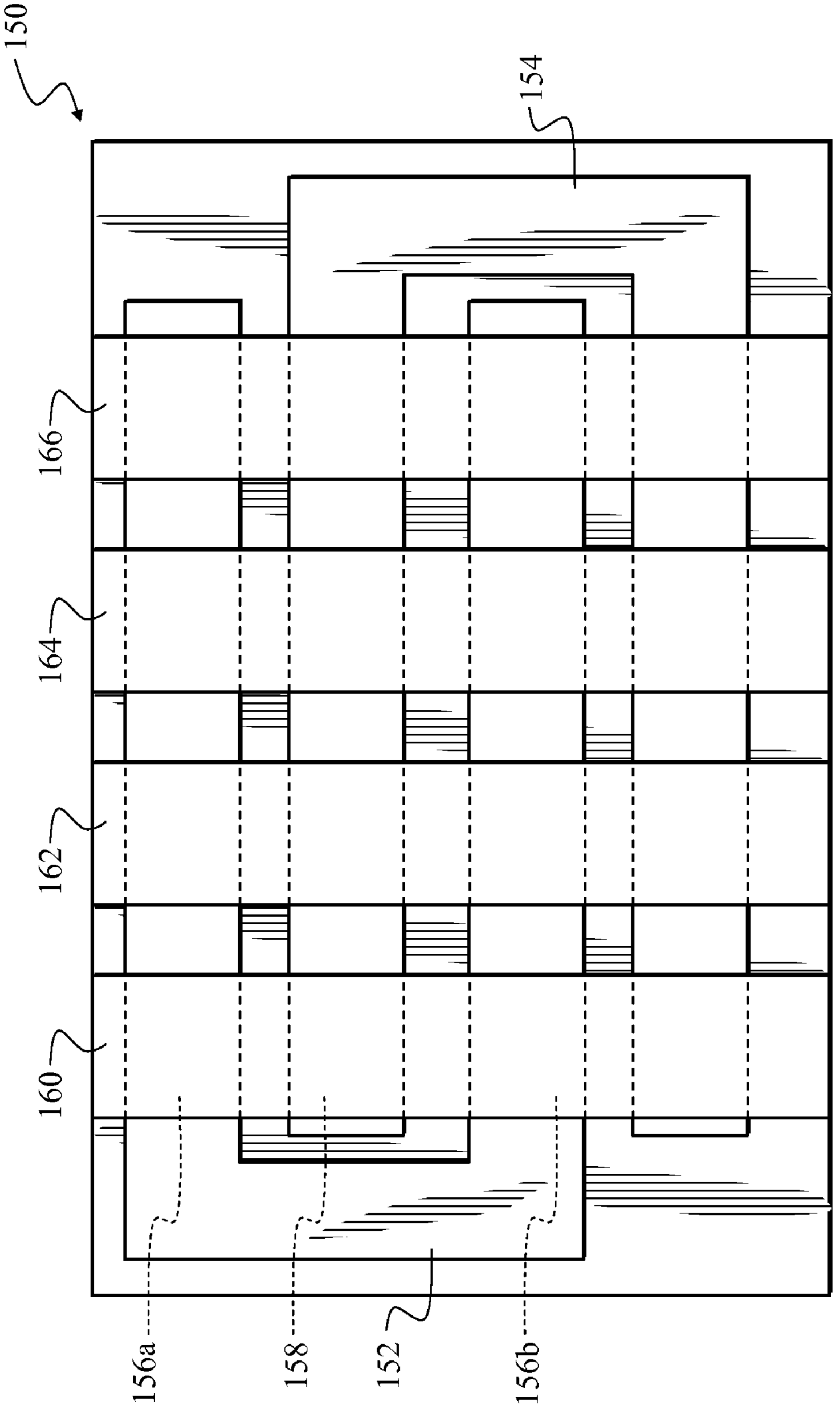
FIG. 7 is a plan view of the row electrode layer for a passive matrix OLED display according to an embodiment of the present invention.

One such embodiment of a pair of row electrodes 152, 154 and areas of the light-emitting elements defined by the intersection of these row electrodes 152, 154 and column electrodes 160, 162, 164, 166 is shown in FIG. 7. Within this figure, three points of intersection of the row electrodes 152, 154 and the column electrode 160, defining three sub-elements are numbered as 156*a*, 156*b*, and 158. As shown, two row electrodes 152, 154 are formed within a portion of a display 150. However, these two row electrodes are not straight lines as is practiced within the art but instead are c-shaped to allow two lines that form the open ends of the c-shaped structure to interlock with the neighboring row electrodes. That is the first row electrode 152, interlocks with the second row electrode 154, such that the two open ends of the c-shaped structure intersect any column electrode to form a single independently-addressable light-emitting element that is comprised of two sub-elements and such that a sub-element on the adjacent electrode lies between the two sub-elements defined by the first row electrode. For example, the two sub-elements 156*a* and 156*b* which are formed at the intersection of the first row electrode 152 with a perpendicular column electrode (not shown), will be driven to the same drive value when a voltage differential is created between the first row electrode 152 and the column electrode. The light-emitting element 158 is positioned between and driven independent of these two sub-elements 156*a*, 156*b* as it is connected to the second row electrode 154.

When different organic electro-luminescent materials are deposited at the light-emitting element 158 than is deposited at the light-emitting element 156, or when a color filter or color change material is deposited such that it influences the color of light for one of these light-emitting elements differently than for the other, it is possible to obtain a display with improved visual uniformity. This display includes at least a first independently-addressable light-emitting element 156 for producing a first color of light and a second independently-addressable light-emitting element 158 for producing a second color of light; wherein at least the first independently-addressable light-emitting element 156 is subdivided into at least two commonly-addressed sub-elements 156*a*, 156*b* and wherein at least a portion of the second independently-addressable light-emitting element 158 is positioned between the commonly-addressed sub-elements of the first independently-addressable light-emitting element.

The invention has been described in detail with particular reference to certain preferred embodiments thereof, but it will be understood that variations and modifications can be effected within the spirit and scope of the invention.

PARTS LIST

2 display
4 independently-addressable light-emitting element
4*a*, 4*b* commonly-addressed sub-elements
6 independently-addressable light-emitting element
6*a*, 6*b* commonly-addressed sub-elements
8 independently-addressable light-emitting element
10 independently-addressable light-emitting element
12 connection
14 connection
20 display
22 independently-addressable light-emitting element for emitting red light
22*a*, 22*b* commonly-addressed sub-elements for emitting red light
24 independently-addressable light-emitting element for emitting white light
24*a*, 24*b* commonly-addressed sub-elements for emitting white light
26 independently-addressable light-emitting elements for emitting green light
26*a*, 26*b* commonly-addressed sub-elements for emitting green light
28 independently-addressable light-emitting element for emitting blue light
28*a*, 28*b* commonly-addressed sub-elements for emitting blue light
30 connecting line
32 connecting line
34 connecting line
36 connecting line
38 first row
40 second row
42 third row
44 fourth row
46 first column
48 second column
52 chromaticity coordinates for red
54 chromaticity coordinates for green
56 chromaticity coordinates for blue
58 gamut triangle
60 chromaticity coordinates for white
68 portion of display
70 first independently-addressable light-emitting element
70*a*, 70*b*, 70*c*, 70*d*, 70*e* commonly-addressed sub-elements
72 second independently-addressable light-emitting element
72*a*, 72*b*, 72 commonly-addressed sub-elements
74 third independently-addressable light-emitting element
74*a*, 74*b*, 74*c* commonly-addressed sub-elements
76 fourth independently-addressable, light-emitting element
76*a*, 76*b*, 76*c*, 76*d*, 76*e* commonly-addressed sub-elements
90 substrate
92 semiconductor active layer
94 gate dielectric layer
96 gate conductor
98 first insulating layer
100 power line
102 signal line
104 second insulating layer
106 first electrode
108 connector segment
110 inter-pixel dielectric
112 organic electro-luminescent material layer
114 second electrode
116 light emission
120 display portion
122 first independently-addressable, light-emitting element
122*a*, 122*b* commonly-addressable sub-elements
126 via
128 second independently-addressable, light-emitting element
128*a*, 128*b* commonly-addressed sub-elements
130 via
150 display portion
152 first row electrode
154 second row electrode
156 first independently-addressable light-emitting element
156*a*, 156*b* commonly-addressed sub-elements
158 second independently-addressable light-emitting element
160 column electrode
162 column electrode
164 column electrode
166 column electrode
170 display
172 red independently-addressable, light-emitting element
172*a*, 172*b* commonly-addressable sub-elements
174 white independently-addressable, light-emitting element
174*a*, 174*b* commonly-addressable sub-elements
176 green independently-addressable, light-emitting element
176*a*, 176*b* commonly-addressable sub-elements
178 blue independently-addressable, light-emitting element
178*a*, 178*b* commonly-addressable sub-elements
180 blue independently-addressable, light-emitting element
180*a*, 180*b* commonly-addressable sub-elements
182 green independently-addressable, light-emitting element
182*a*, 182*b* commonly-addressable sub-elements
184 red independently-addressable, light-emitting element
184*a*, 184*b* commonly-addressable sub-elements
186 white independently-addressable, light-emitting element
186*a*, 186*b* commonly-addressable sub-elements
188 first column
190 second column
192 third column
194 fourth column
196 first row
198 second row
200 third row
202 fourth row
204 connecting line
206 connecting line
208 connecting line
210 connecting line
212 connecting line
214 connecting line
216 connecting line
218 connecting line

What is claimed is:

1. A display with improved visual uniformity and sharpness, comprising:

a) a substrate;

b) a plurality of active-matrix circuits, each active matrix circuit, including a thin film transistor formed on the substrate; and c) an array of groups of light-emitting elements formed on the substrate, each group emitting at least three colors of light, each light-emitting element within the group associated with a different active-matrix circuit, and wherein each group includes including:

i) a first low luminance light-emitting element connected to a single active-matrix circuit of the plurality of active-matrix circuits, the first low luminance light-emitting element subdivided into at least two spatially separated, light-emitting areas such that each is actuated by the same signal for producing a first color of light, wherein the spatially separated light-emitting areas of the first light-emitting element lie substantially along a first dimension direction;

ii) a second low luminance light-emitting element connected to a single active-matrix circuit of the plurality of active-matrix circuits, the second low luminance light-emitting element subdivided into at least two spatially separated, light-emitting areas such that each is actuated by the same signal for producing a second color of light different from the first; wherein at least one area of the second low luminance light-emitting element is positioned between the spatially separated light-emitting areas of the first low luminance light-emitting element, and the spatially separated light-emitting areas of the second light-emitting element lie substantially along a second dimension direction which is different from the first direction; and iii) a third high luminance light-emitting element, connected to a single active-matrix circuit of the plurality of active-matrix circuits, each of the third high luminance light-emitting element formed from a single light-emitting area for producing a third color of light different from the first or second; wherein the number of each of the first and the second low luminance light-emitting elements is fewer than the number of the third high luminance light-emitting elements, and light-emitting areas of the same luminance are spaced apart by less than one minute of arc.

2. The display of claim 1, each group further includes:

a fourth high luminance light-emitting element connected to a single active-matrix circuit of the plurality of active-matrix circuits, the fourth high luminance light-emitting element formed from a single light-emitting area for producing the third color of light.

3. The display of claim 1, each group further includes:

a fourth high luminance light-emitting element, connected to a single active-matrix circuit of the plurality of active-matrix circuits, the fourth high luminance light-emitting element formed from a single light-emitting area for producing a fourth color of light different from the first, second or third color of light.

4. The display of claim 1, wherein the display is an electroluminescent display employing a top emitting architecture and further includes an electrode segment associated with each spatially separated light-emitting area and connecting lines for connecting each electrode segment to the single active-matrix circuit, the electrode segment and the connecting line formed in a common layer.

5. The display of claim 1, wherein the first light-emitting element includes an electrode which is patterned to form a plurality of electrode segments which spatially define the spatially separated light-emitting areas of the light-emitting elements, and wherein each light-emitting element additionally includes connecting lines for electrically connecting each of the plurality of electrode segments such that each light-emitting area receives the same signal.

6. A display with improved visual uniformity and sharpness, comprising:

a) a substrate;

b) a plurality of active-matrix circuits, each active matrix circuit, including a thin film transistor formed on the substrate; and c) an array of groups of light-emitting elements formed on the substrate, each group emitting at least three colors of light, each light-emitting element within the group associated with a different active-matrix circuit, and wherein each group includes:

i) at least a first low luminance light-emitting element connected to a single active-matrix circuit of the plurality of active-matrix circuits, the first low luminance light-emitting element subdivided into at least two spatially separated, light-emitting areas such that each is actuated by the same signal for producing a first color of light, wherein the spatially separated light-emitting areas of the first light-emitting element lie substantially along a first direction;

ii) at least a second low luminance light-emitting element connected to a single active-matrix circuit of the plurality of active-matrix circuits, the second low luminance light-emitting element subdivided into at least two spatially separated, light-emitting areas such that each is actuated by the same signal for producing a second color of light different from the first;

wherein at least one area of the second low luminance light-emitting element is positioned between the spatially separated light-emitting areas of the first low luminance light-emitting element, and the spatially separated light-emitting areas of the second light-emitting element lie substantially along a second direction which is different from the first direction; and iii) third high luminance light-emitting elements connected to a single active-matrix circuit of the plurality of active-matrix circuits, the third high luminance light-emitting elements formed from a single light-emitting area for producing a third color of light different from the first or second; wherein the number of each of the first and the second low luminance light-emitting elements is fewer than the number of the third high luminance light-emitting elements, and light-emitting areas of the same luminance are spaced apart by less than one minute of arc.

7. The display of claim 6, each group further includes:

a plurality of fourth high luminance light-emitting elements, each connected to a single active-matrix circuit of the plurality of active-matrix circuits, each of the fourth high luminance light-emitting element formed from a single light-emitting area for producing a fourth color of light different from the first, second or third color of light.

8. The display of claim 6, wherein the display is an electroluminescent display employing a top emitting architecture and further includes an electrode segment associated with each spatially separated light-emitting area and connecting lines for connecting each electrode segment to the single active-matrix circuit, the electrode segment and the connecting line formed in a common layer.

9. The display of claim 6, wherein the first light-emitting element includes an electrode which is patterned to form a plurality of electrode segments which spatially define the spatially separated light-emitting areas of the light-emitting elements, and wherein each light-emitting element additionally includes connecting lines for electrically connecting each of the plurality of electrode segments such that each light-emitting area receives the same signal.

* * * * *